US006976268B2

(12) United States Patent
Courtney et al.

(10) Patent No.: US 6,976,268 B2
(45) Date of Patent: Dec. 13, 2005

(54) METHODS AND APPARATUS FOR EFFICIENTLY ACCESSING PERIODICALLY BROADCAST DATA

(75) Inventors: Jonathan D. Courtney, San Jose, CA (US); Jesus David Rivas, San Francisco, CA (US); James Van Loo, Los Altos, CA (US); Bartley H. Calder, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 726 days.

(21) Appl. No.: 09/733,609

(22) Filed: Dec. 8, 2000

(65) Prior Publication Data

US 2002/0116711 A1   Aug. 22, 2002

Related U.S. Application Data

(60) Provisional application No. 60/172,701, filed on Dec. 10, 1999.

(51) Int. Cl.[7] ............................................. H04N 7/175
(52) U.S. Cl. ...................... 725/134; 725/142; 725/139; 725/100; 725/115
(58) Field of Search ........................... 725/50, 68, 100, 725/131, 134, 139, 142; 709/204, 217, 219; 718/1, 100, 104

(56) References Cited

U.S. PATENT DOCUMENTS

| | | | | |
|---|---|---|---|---|
| 5,187,787 A | * | 2/1993 | Skeen et al. ................. 719/314 |
| 5,652,613 A | * | 7/1997 | Lazarus et al. ................ 725/50 |
| 5,666,293 A | | 9/1997 | Metz et al. | |
| 5,666,645 A | * | 9/1997 | Thomas et al. ................ 725/47 |
| 5,841,443 A | * | 11/1998 | Einkauf ...................... 345/586 |
| 5,900,905 A | | 5/1999 | Shoff et al. | |
| 5,903,816 A | * | 5/1999 | Broadwin et al. ........... 725/110 |
| 5,929,850 A | * | 7/1999 | Broadwin et al. ........... 725/110 |
| 6,005,631 A | * | 12/1999 | Anderson et al. .............. 725/53 |
| 6,011,537 A | * | 1/2000 | Slotznick ..................... 345/733 |
| 6,029,195 A | * | 2/2000 | Herz ........................... 725/116 |
| 6,057,886 A | * | 5/2000 | Van Gestel .................. 725/54 |
| 6,167,567 A | * | 12/2000 | Chiles et al. ................ 717/173 |
| 6,177,930 B1 | * | 1/2001 | Chernock et al. ............ 715/716 |
| 6,209,131 B1 | * | 3/2001 | Kim et al. ..................... 725/50 |
| 6,256,393 B1 | * | 7/2001 | Safadi et al. ............... 380/232 |
| 6,271,893 B1 | * | 8/2001 | Kawaguchi et al. ........ 348/725 |
| 6,275,989 B1 | * | 8/2001 | Broadwin et al. ............ 725/37 |
| 6,314,571 B1 | * | 11/2001 | Ogawa et al. ................ 725/48 |

(Continued)

FOREIGN PATENT DOCUMENTS

EP             0 823 798 A1     2/1998

(Continued)

OTHER PUBLICATIONS

Balabanian et al, An Introduction to Digital Storage Media—Command and Control, Nov. 1996, IEEE Communications Magazine, pp. 122-127.*

*Primary Examiner*—John Miller
*Assistant Examiner*—Jason Salce
(74) *Attorney, Agent, or Firm*—Beyer Weaver & Thomas, LLP

(57) ABSTRACT

The invention relates to methods and apparatus for accessing data that is periodically transmitted by a broadcaster. In accordance with one aspect of the invention, a receiver capable of reception of data is disclosed. The data is transmitted by a broadcaster in a broadcasting system. The receiver reduces the delay conventionally encountered in accessing periodically transmitted data in a broadcasting system.

21 Claims, 5 Drawing Sheets

U.S. PATENT DOCUMENTS

| | | | | |
|---|---|---|---|---|
| 6,314,575 | B1 * | 11/2001 | Billock et al. | 725/87 |
| 6,317,885 | B1 * | 11/2001 | Fries | 725/109 |
| 6,405,372 | B1 * | 6/2002 | Kim et al. | 725/50 |
| 6,408,437 | B1 * | 6/2002 | Hendricks et al. | 725/132 |
| 6,453,471 | B1 * | 9/2002 | Klosterman | 725/41 |
| 6,459,427 | B1 * | 10/2002 | Mao et al. | 725/109 |
| 6,460,181 | B1 * | 10/2002 | Donnelly | 725/50 |
| 6,478,222 | B1 * | 11/2002 | Sarfati | 235/380 |
| 6,530,086 | B1 * | 3/2003 | Brodigan | 725/95 |
| 6,591,421 | B1 * | 7/2003 | Sullivan | 725/50 |
| 6,597,891 | B2 * | 7/2003 | Tantawy et al. | 455/3.05 |
| 6,606,748 | B1 * | 8/2003 | Tomioka et al. | 725/50 |
| 6,611,902 | B2 * | 8/2003 | Kuroda et al. | 711/162 |
| 6,637,029 | B1 * | 10/2003 | Maissel et al. | 725/46 |
| 6,675,385 | B1 * | 1/2004 | Wang | 725/39 |
| 6,675,388 | B1 * | 1/2004 | Beckmann et al. | 725/136 |
| 6,690,481 | B1 * | 2/2004 | Yeung et al. | 358/1.15 |
| 6,718,551 | B1 * | 4/2004 | Swix et al. | 725/32 |
| 6,727,955 | B2 * | 4/2004 | Pereboom | 348/468 |
| 6,742,121 | B1 * | 5/2004 | Safadi | 713/187 |

FOREIGN PATENT DOCUMENTS

| | | |
|---|---|---|
| EP | 0 827 340 A2 | 3/1998 |
| EP | 0 827 340 A3 | 10/1999 |

* cited by examiner

METHODS AND APPARATUS FOR EFFICIENTLY ACCESSING PERIODICALLY BROADCAST DATA

CROSS-REFERENCE TO RELATED APPLICATIONS

This application claims the benefit of: (i) U.S. Provisional Patent Application No. 60/172,701, filed Dec. 10, 1999, and entitled "METHODS AND APPARATUS FOR EFFICIENTLY ACCESSING PERIODICALLY BROADCAST DATA", and which is hereby incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention generally relates to broadcast systems. More particularly, the present invention provides methods and apparatus for accessing data that is periodically transmitted by a broadcaster.

2. Description of the Related Art

In a conventional broadcasting system, a broadcaster transmits information in the form of audio, video, data, etc. over a medium such as air, cable, phone line (DSL, for example) that can be received by any number of receivers. For example, transmitted radio waves can be received with a radio receiver tuned to a particular transmission channel. Conventional broadcast communication is typically a one way communication since the receiver does not having control over the content of nor the time of the broadcast transmission.

To facilitate discussion, FIG. 1 illustrates a T.V broadcast system 100 that includes a T.V broadcaster 102 and a T.V receiver 104. The T.V receiver 104 can be an analog or a digital T.V receiver suitable for reception of voice, video, and data transmitted by the T.V broadcaster 102. In a broadcast system, data can be transmitted in a cyclical manner conceptualized in the art as a "data carousel" 106. As used herein, a data carousel refers to a mechanism for cyclic transmission of data modules, for example, as defined by MPEG-2 Digital Storage Medium Command and control (DSM-CC of ISO/IEC 138118-6) User-to-Network Download Protocol. To elaborate, the carrousel 106 illustrates cyclical transmission of data in the broadcast system 100. Data on the carrousel 106 can include data segments A, B, C, and D. Each data segment, such as data segment A, can consist of individual data files X1, X2, X3, and X4. During a typical broadcast session, the carrousel 106 can be visualized as rotating clockwise such that data on the carrousel 106 is transmitted when it reaches a transmission point 108. In this manner data portions A, B, C, and D are sequentially transmitted as the carrousel 106 rotates clockwise in such a manner that a particular data file is re-transmitted when carrousel 106 completes its rotation with respect to an associated point of transmission. For example, the data file X1 will be re-transmitted every time the associated reference point 108 undergoes a full rotation. In this way, each of the data files on the carrousel 106 is cyclically re-transmitted every T seconds, where T is the time it takes for carrousel 106 to make a complete rotation with respect to the point of transmission 108, also referred to as the carousel's period.

Unfortunately, however, due to the cyclical nature of the carrousel type broadcasting system, the T.V broadcast system 100 has an inherent delay associated with the re-transmission of data. To elaborate, at a time t1 when a vertical bar 110 is aligned with the point of transmission 108, the T.V broadcaster 102 will start transmitting the data file X1. The transmission of data file X1 will complete at a subsequent time t2 when transmission of data file X2 is initiated. If the T.V receiver 104 requires data file X1 some time after transmission of data file X1, the T.V receiver 104 must wait until file X1 is retransmitted which could be at most at a time T later. For example, it data file X1 is required by the receiver 104 at a time t2 (which for this example happens to be shortly after transmission of file X1 has completed) a potentially long delay will be encountered before file X1 is re-transmitted. This delay can be almost as long as the time T required to complete a full transmission cycle.

Thus, cyclical retransmission of data can result in long delays between the time data is requested (or needed) and the time data is received and accessed. With carrousels typically having hundreds of megabytes of data, the periodic nature of the data carrousel arrangement could potentially result in delays of up to several seconds in accessing required data. This potential delay is exacerbated in those situations where the broadcast medium include low bandwidth links, such as the Internet. Even though this delay may not be very significant in non-interactive situations, it can be especially problematic for interactive applications such as interactive T.V, such as WEB TV™, where it is highly desirable to provide a user with requested information on demand.

In view of foregoing, there is a need for improved methods and apparatus to for accessing data in a real time basis in broadcast systems.

SUMMARY OF THE INVENTION

Broadly speaking, the invention relates to methods and apparatus for accessing data that is periodically transmitted by a broadcaster. In accordance with one aspect of the invention, a receiver capable of reducing the delay conventionally encountered in accessing periodically transmitted data in a broadcasting system is disclosed. In one embodiment, the receiver includes a file accessing system capable of providing access to a storage medium arranged to selectively store data that is periodically transmitted by the broadcaster. In this way, because the selected periodically transmitted data is saved in the storage medium it can be accessed quickly by the receiver.

In accordance with another embodiment of the present invention, a receiver including a data accessing system and a data storage medium is disclosed. Data transmitted by the broadcasters can be stored in the data storage medium. In this way, data is readily available for access by the data accessing system, thereby reducing the delay associated with accessing periodically broadcast data in a broadcast system.

In another embodiment, the receiver includes a viewing portion suitable for displaying images such as a T.V monitor, a computer monitor, and the like. A user may interact with the receiver. For example, while watching the broadcast of a sporting event, a viewer may request specific information relating to the sporting event as it is being displayed in the viewing portion.

In accordance with another embodiment of the present invention, a data accessing system including a data access requester and a data accessor, is disclosed. In one embodiment, multiple requests to store data are processed independently by a data saver using multiple processing threads. In this manner, requests to store data can quickly be made by a data access requester and efficiently processed by a data saver. A request to store data can be dispatched as soon as the need for data is perceived, e.g. a user has activated an interactive button to request information. Alternatively, the data access requester can dispatch requests to the data saver, in anticipation of future need, e.g., when it is anticipated that a particular data file will be required for access.

A method of accessing data in a broadcast system, in accordance with a particular embodiment of the present invention. A new class can be defined to represent a periodically transmitted file in a broadcast system, e.g., a carrousel file class. An instance of the new class is instantiated. Next, an instance of a data accessing object for the new class is created. In one embodiment, creating an instance of a data accessing object is achieved by instancing pre-defined data accessing operations, e.g., file input output (I/O) operations. Thus, pre-existing data accessing operations, e.g., for accessing conventional files can be re-defined and re-used to access a new file class, e.g., a carrousel file class. Prior to accessing data, a request is made to acquire data. This request initiates a new independent process, e.g., another threat of execution, in accordance with one embodiment of the present invention.

The invention has numerous advantages. One advantage is that the delay time for accessing data in a broadcasting system is significantly reduced. Another advantage is that data access can be provided without requiring a receiver to know the exact location of data. Yet another advantage is that data version updates can be provided to a receiver efficiently. Still another advantage is that cost effective and simple solutions can be implemented by using familiar file access facilities.

The invention can be implemented in numerous ways, including as a computer system, an apparatus, and a method. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to methods, apparatus, and data structures suitable for accessing data in a broadcast system. In accordance with one aspect of the invention, a receiver capable of storing periodically transmitted data is disclosed. By storing the data locally, the receiver reduces the delay conventionally encountered in accessing periodically transmitted data in a broadcasting system. In one embodiment, the receiver includes a file accessing system capable of providing access to a storage medium containing data transmitted by the broadcaster. Selected portions of the periodically transmitted data are saved in the storage medium thereby providing quick access by the receiver in those situations, such as interactive TV, where fast response is essential.

Figure 1:
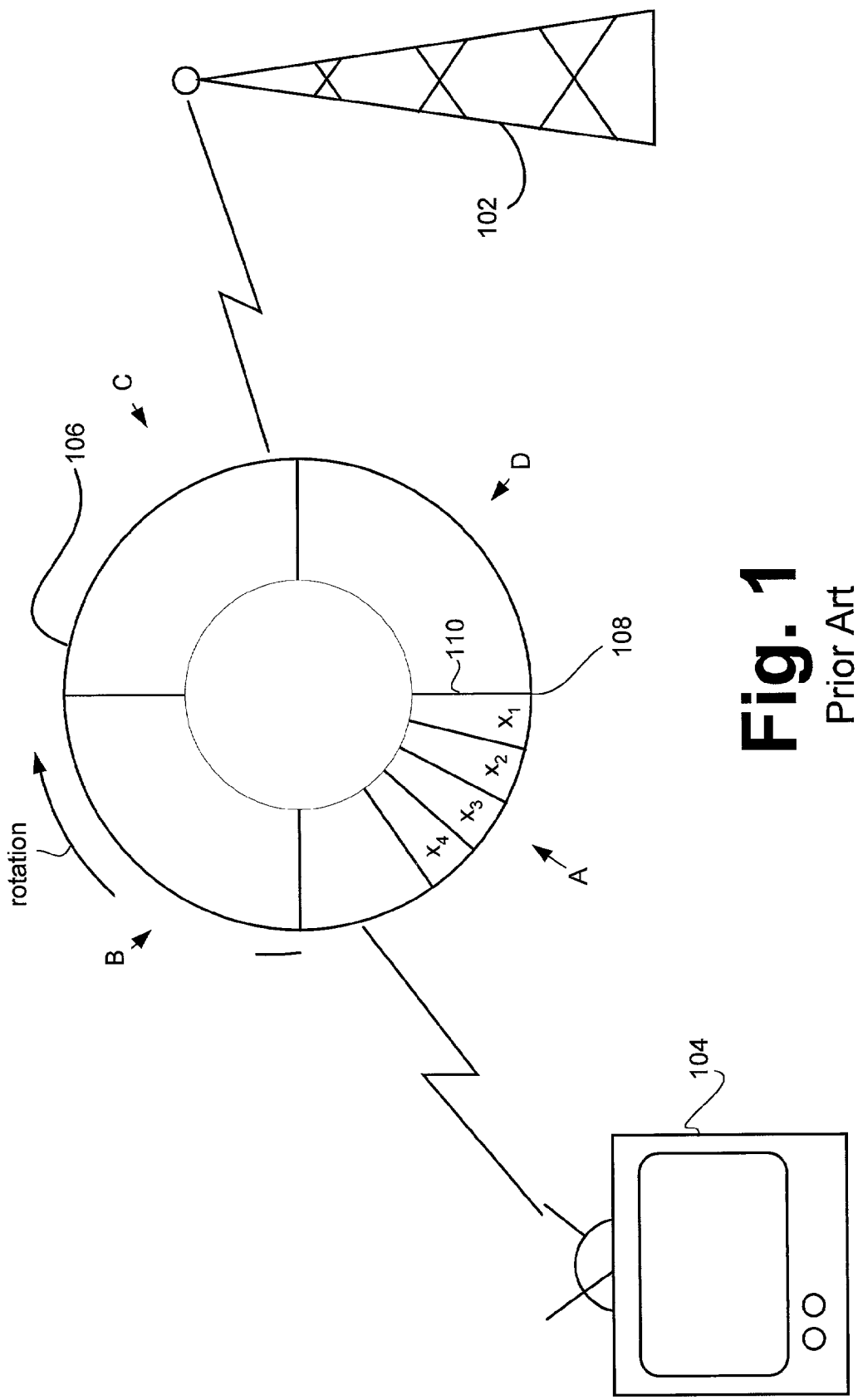
FIG. 1 illustrates a T.V broadcast system including a broadcaster and a T.V receiver.
Figure 2:
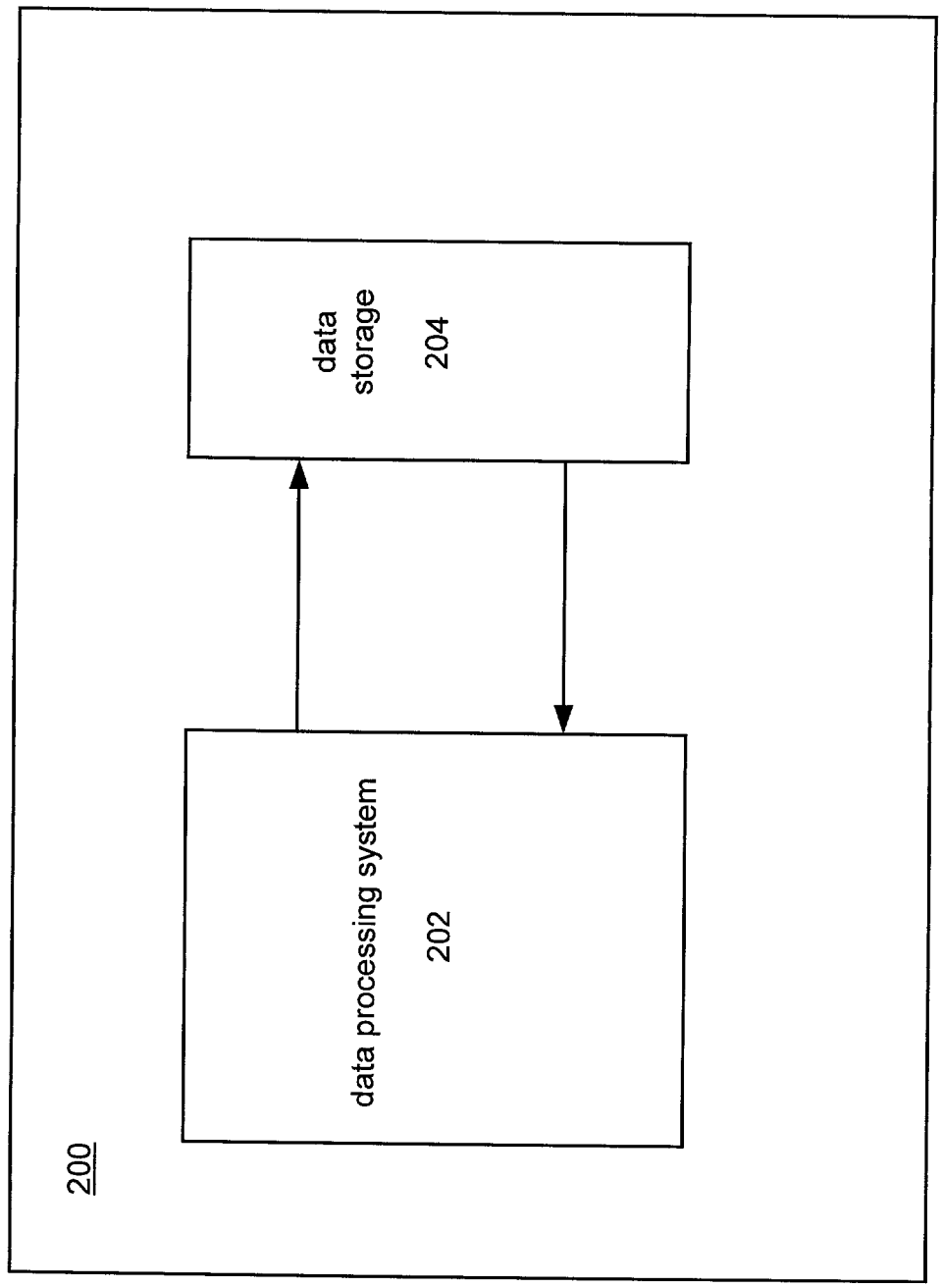
FIG. 2 illustrating a receiver suitable for accessing data transmitted by a broadcaster in a broadcasting system in accordance with one embodiment of the present invention.

Referring now to FIG. 2 illustrating a receiver 200 suitable for accessing data transmitted by a broadcaster in a broadcasting system, in accordance with one embodiment of the present invention. The receiver 200 includes a data accessing system 202 and a data storage medium 204. It should be noted that the receiver 200 can be any device suitable for reception of broadcast data, e.g., a digital T.V, set-top box, analog T.V, a computer including a lap top computer, etc. For example, the receiver can be a digital TV or a set up box running an interactive program. The receiver can be implemented as a virtual machine supporting an open interface, e.g., Java, Java T.V, etc. Data transmitted by the broadcaster can be stored in the data storage medium 204. In this way, data is readily available for access by the data accessing system 202 thereby reducing the delay associated with accessing the periodically broadcast data. In one implementation, the storage medium 204 is a hard disk type device capable of storing hundreds of megabytes of data, however, it should be noted that the storage medium 204 can be any storage device suitable for storing data such as magnetic tape, Random Access Memory (RAM), Compact Disk (CD), floppy disk, and the like.

Although the data storage medium 204 is depicted as a part of the receiver 200, it should be noted that data storage medium 204 can reside outside of the receiver 200 without departing from the scope and spirit of the invention. Alternatively, data storage medium 204 can be implemented as a part of data accessing system 202. It should also be noted that the data storage medium 204 can be implemented as a buffer or other suitable mechanisms to pass data to data accessing system 202.

Figure 3:
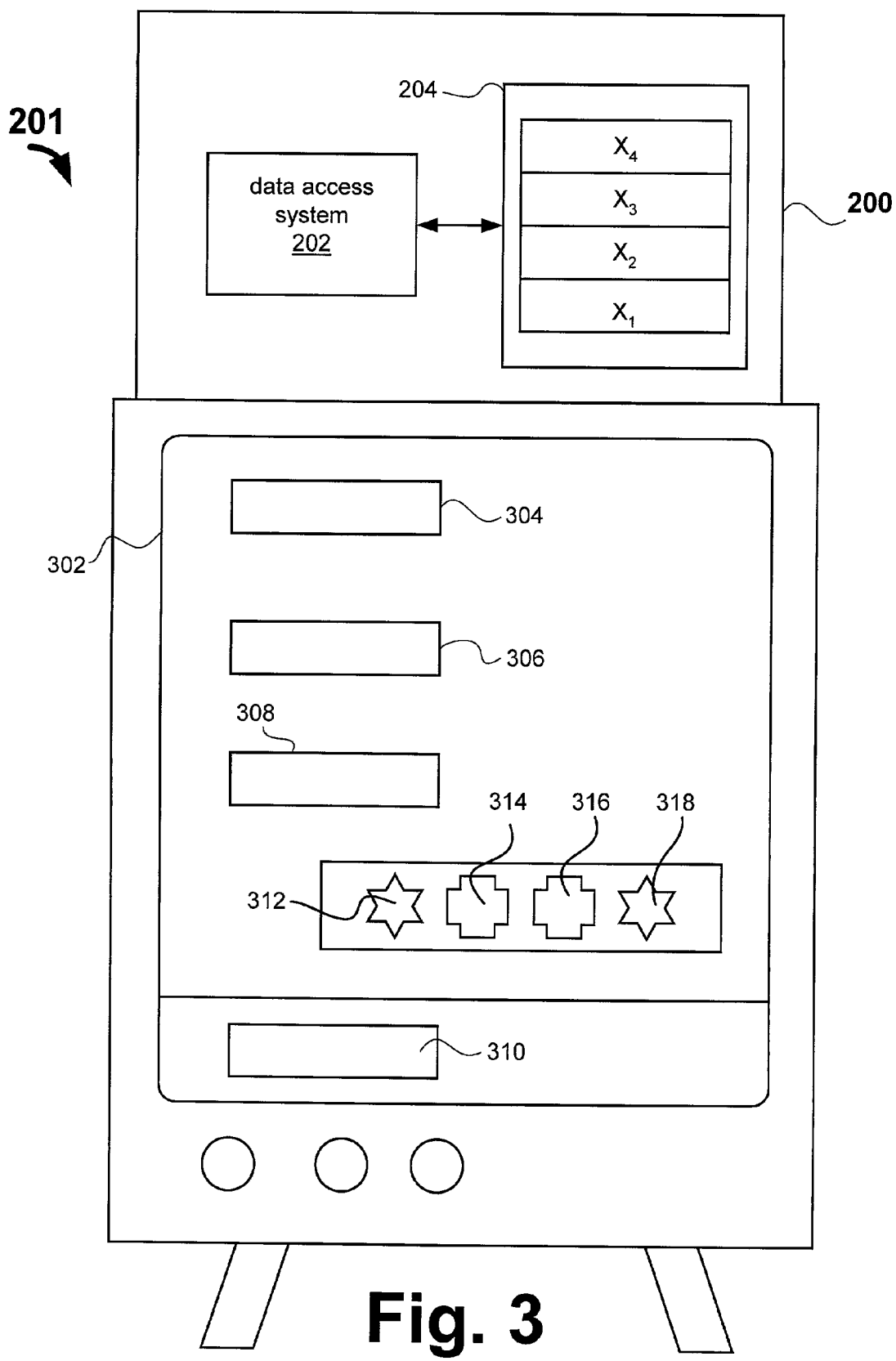
FIG. 3 illustrates a receiving system in accordance with another embodiment of the present invention.

Referring now to FIG. 3, illustrating a system 201 that includes the receiver 200 coupled to the data accessing system 202, the data storage medium 204, and a display 302 in accordance with another embodiment of the present invention. The display 302 is any device suitable for displaying images such as a T.V monitor, a computer monitor, and the like. The displayed images can include graphics, text, video, etc. Images can be displayed in one or more viewing portions 304, 306, and 308 that can take the form of graphical user interface (GUI) elements useful in providing control and data inputs as well as displaying output data. In the described embodiment, various audio signals can be generated by an audio outputting device 310. In addition, a user may interact with the receiver 200 using the various GUI elements included in the viewing portions 304–308.

For example, while watching the broadcast of a sporting event, a viewer may request specific information relating to the sporting event as it is being displayed in the display 302 by clicking, or in some cases, unclicking, various ones of the GUI elements.

More particularly, a user may interact with the receiver 200 through an interactive portion 312 by activating one of GUI elements 314–318 that are located on the interactive portion 312. For example, by activating a particular GUI element such as GUI element 314, the user may request current statistics for a particular player in the sporting event. Typically, the requested information is maintained in a data file, e.g., data file X1 that is periodically transmitted by the broadcaster.

As discussed in the background, in a conventional broadcast system that periodically broadcasts data, there is a delay between re-transmissions of a particular data file, e.g., data file X1. However, with the inventive receiver 200, the substantial delays associated with conventionally configured receivers are effectively eliminated since required data is stored locally. In this way, when the GUI element 314, for example, is clicked, corresponding data stored in the storage medium 204 is made immediately available thereby providing a highly interactive environment for the user.

Advantageously, receiver 200 can access data stored in a data storage medium 204. Thus, desired data, e.g., a particular file X1 is readily available and can be accessed by the data accessing system 202 as soon data is required, such as when a user has requested data. It should be noted as well there can implemented a variety of different techniques well known by those skilled in the art for selectively storing data in storage medium 204. As another example, once a request for a particular data file has been made, the data file can be kept in storage medium 204 for future use.

In one embodiment, data accessing system 202 dispatches requests for data to be stored in the storage medium 204. Multiple requests to store data, e.g., data file X1, X2, X3 can be dispatched by data accessing system 202. In addition, in a multi-threaded environment, multiple requests to store data can be processed independently using, for example, independent threats of execution. In this way, a request to store data can be dispatched as soon as a need to access data is perceived by the receiver 200. Alternatively, a request maybe dispatched in anticipation of requiring access to data at a later time. In this manner, delays normally encountered in accessing broadcast data are significantly reduced.

Figure 4:
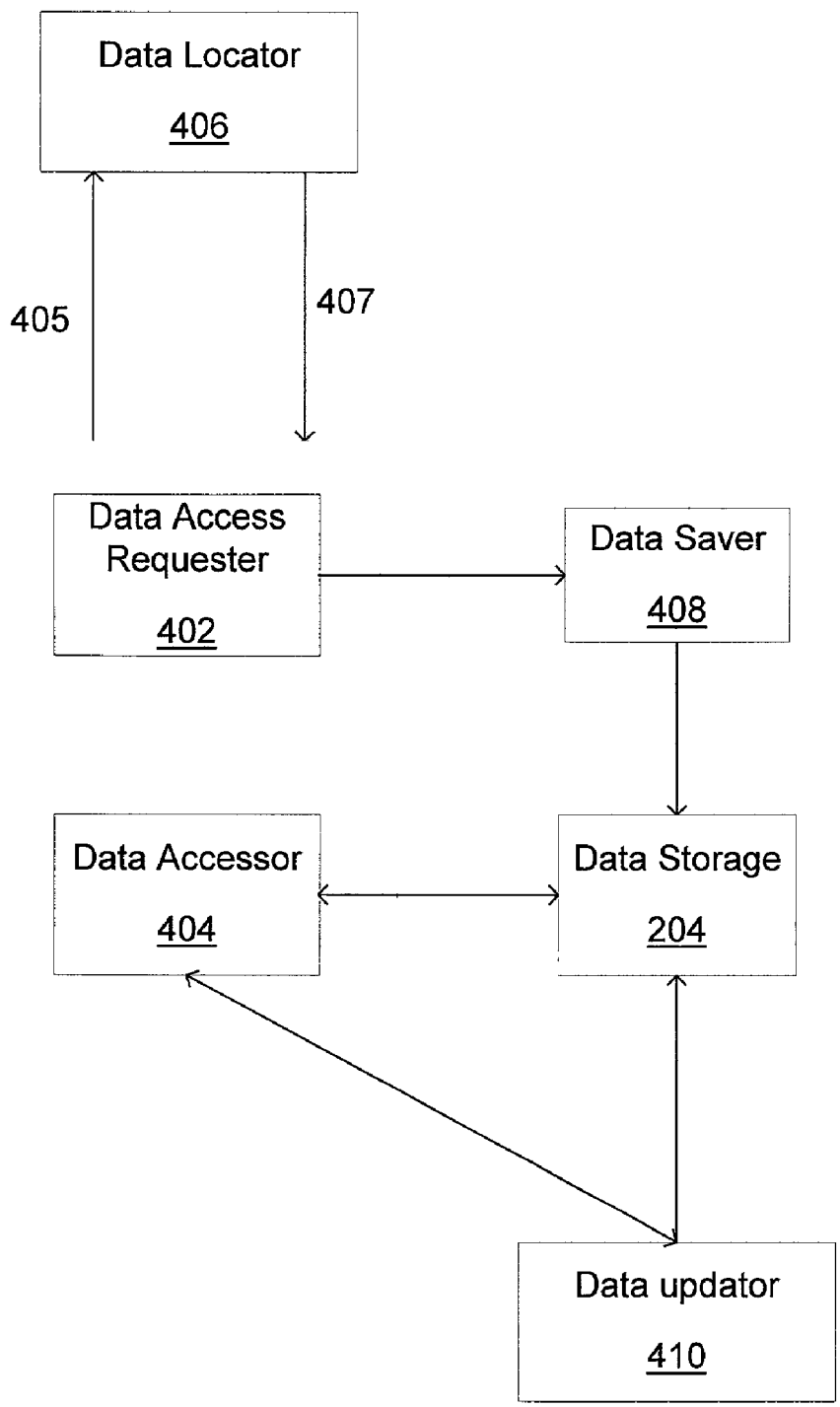
FIG. 4 illustrates a data accessing system in accordance with yet another embodiment of the present invention.

FIG. 4 illustrates the data accessing system 202 in accordance with yet another embodiment of the present invention. The data accessing system 202 includes a data access requester 402 and a data accessor 404. Data access requester 404 receives a data identifier 405 that identifies data that is to be accessed by the data accessing system 202. For example, data identifier 405 can be a filename associated with a particular data file X1 transmitted by the broadcaster. The data identifier 405 provides a level of abstraction allowing the data access system 202 to request data without having specific knowledge of the location of data. Providing a data identifier is especially useful in broadcasting systems where data can be moved frequently by the broadcaster and without knowledge of the receiver 200. Data access requester 402 outputs the data identification 405 to a data locator 406, e.g., a filename to a data locator. Data locator 406, in turn provides the data access requester 402 with a specific address, such as a data indicator 407 that indicates the location of data, for example, a particular channel of a certain data carrousel, and so forth.

Using the data locator 407, the data access requester 402 dispatches a request to store the desired data in the storage medium 204. This request can be sent to and processed independently by a data saver 408. Advantageously, this frees the data access requester 402 for more processing, e.g., to dispatch more requests to store data. Data saver 408 can use the data locator information provided by data access requestor 402 to obtain the requested data. Data maybe obtained directly by data saver 408 from the broadcaster, or in the alternative, the requested data can be provided to the data saver 408. Once the requested data is obtained, the data saver 408 can store it in storage medium 204, if so desired.

In accordance with one embodiment of the present invention, multiple requests to store data are processed independently by data saver 402, using multiple processing threads. In this manner, requests to store data can quickly be made by data access requester 402 and efficiently processed by the data saver 408. A request to store data can be dispatched as soon as the need for data is perceived, e.g. a user has activated an interactive button to request information. Alternatively, data access requester 402 can dispatch requests to data saver 408, in anticipation of future need, e.g., when it is anticipated that a particular data file will be required for access.

In one embodiment, data access requestor 402 also outputs the data locator 407 to data assessor 404. Using the data locator 407, data assessor access the desired data from storage medium 204. In one embodiment, data assessor 404 is notified as soon as data is stored by data saver 408. It should be noted that this notification can be send by data saver 408 or by any other appropriate mechanism substantially simultaneously with the data assessor 404 accessing data from the storage medium 204. In this way, data such as data file X1 can be retrieved while the data saver 408 is processing additional data requests for more data, such as the data files X1, X2, X3, or X4. Additionally, the data saver 408 can store data files in the storage medium 204 as they become available.

Data accessing system 202 can optionally send a request to be notified of changes to data such changes include version changes to a particular data file that maybe stored in the storage medium 204. This request can be sent to a data updater 410. The broadcaster can signal when data has been updated by, for example, setting a flag in the transmitted file to indicate an updated version of a particular data file. When an updated version of the data is transmitted by the broadcaster, the data updater 410 notifies the data access system 202. Data updater 410 can then store the updated version of the data into storage medium 204. Alternatively, upon reception of a version change notification, data access requester 402 can dispatch another request to the data saver 408 to store the updated version. In this manner, data accessing system 202 can be notified of version changes to a particular data file without having to constantly poll data files. Given inherent delays associated with re-transmission of data files in a broadcasting system, polling maybe an inefficient mechanism for providing data updates. Thus, the present invention allows for efficient ways of providing notification of data changes.

Figure 5:
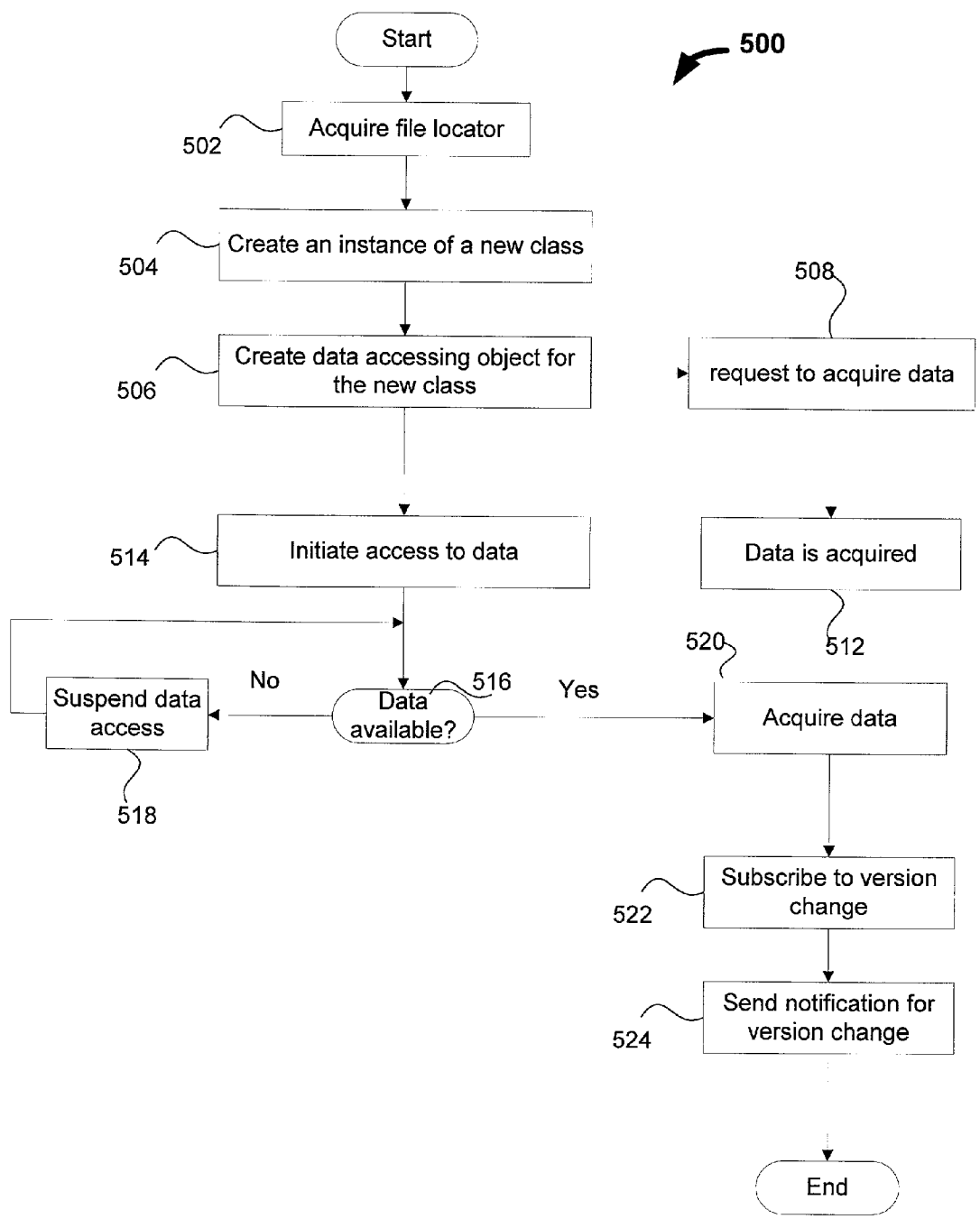
FIG. 5 illustrates a method of accessing data in a broadcast system in accordance with a particular embodiment of the present invention.

FIG. 5 illustrates a method 500 of accessing data in a broadcast system, in accordance with a particular embodiment of the present invention. As noted above, in a broadcast system data can be transmitted cyclically. The file system could be a complex multilevel structure, e.g., a hierarchical file system with directory files containing one or more files. As shown in FIG. 5, accessing a data file (carousel data file) is initiated in operation 500. The data file (carousel data file)

is transmitted by a broadcaster in a broadcast system. The transmitted information can be received a receiver. Next, in operation 502, a file locator is acquired. Such file locators can identify source of a particular file, e.g., channel number, carrousel number, etc.

In accordance with a particular embodiment of the invention, a new class can be defined to represent a periodically transmitted file in a broadcast system, e.g., a carrousel file class. A carrousel file class can have properties similar to those properties defined for a file class in any object oriented language such as C++, Java, etc. In addition, the carrousel file class can have properties that are specifically defined for periodically transmitted file.

Next, in operation 504, an instance of the new class is instantiated. In one embodiment, a carrousel file class is instantiated. The carrousel file class can be instantiated using the acquired file locator of operation 502. However, it should be noted that a carousel file can be instantiated without requiring a file locator. For example, a carrousel file object can be created using a specified file name in a specified file directory.

An instance of a data-accessing object for the new class is created, in operation 506. For example, this instance can be created using a carousel file object of operation 504. In one embodiment, creating an instance of a data accessing object is achieved by instancing pre-defined data accessing operations, e.g., file input output (I/O) operations. Thus, pre-existing data accessing operations, e.g., for accessing conventional files can be re-defined and re-used to access a new file class, e.g., a carrousel file class. For example, in a particular embodiment, pre-existing file accessing operations such as JAVA.io.fileinput stream, JAVA.io.filereader, JAVA.io.randomaccess, etc. are used to provide access to carrousel files. In this manner, an instance of a data accessing operation can be created in operation 508.

Prior to accessing data, a request is made to acquire data in operation 508. The request can be made using the acquired file locator of operation 502. Operation 508 initiates a new independent process, e.g., another threat of execution, in accordance with one embodiment of the present invention. The process initiated in operation 508 is represented by dotted lines that extend from operation 508 to a operation 512 where data is acquired, e.g., stored in a storage. The initial process, (threat of execution) proceeds from operation 506 to operation 514 where data access is initiated. Next, in decision 516, a determination is made as to whether data is available, e.g. can the desired data be located in the storage. If the desired data is not available, (cannot be located in the storage) data access is suspended as indicated by operation 518. Data access can be initiated when data is made available (data is acquired in operation 512). If data is available (can be located in the storage when decision 512 is made) data can be acquired, as indicated by operation 520. Data can be accessed by using one of data access mechanisms created in operation 506.

In operation 522, a subscription is made to receive notification of any version changes to the data, e.g., carrousel file that was accessed in operation 520. In one embodiment, an operation is defined for the class carrousel file to subscribe an interested listener to receive notification of version changes to a desired carrousel file, e.g., addlistener. A notification receiver can cancel its subscription by performing an operation such as removelistener. Finally, in operation 524 a notification of a change to data, e.g., the carrousel file is received.

Method 500 can be implemented in an application program or applet running on an operating system. The application program or applet can initiate multiple threads of execution that are executed independently by the operating system. In one embodiment, the application program or applet uses a Java TV Application Programming Interface (API) to interface a Virtual Machine running a Real-Time Operating System. The Java TV API provides access to DSM-CC object and data carousels via use of data access mechanisms defined in the JAVA.IO package. The JAVA TV API is an extension of the JAVA platform developed by Sun Microsystems of Mountain View, Calif.

In this manner, given an instance of a carousel file an application may use available file accessing classes such as JAVA.IO package to access data from the carousel object. Reliance on familiar APIs facilities ease of use for applications developers and permits reuse of application code. Use of a high-level access mode also facilitates ease of use and permits implementation flexibility across receivers of different manufactures. This invention can be utilized in numerous application e.g., enhanced television, video on demand, electronic programming guides interactive multi camera angles for sporting event, etc.

Although only a few embodiments of the present invention have been described, it should be understood that the present invention may be embodied in many other specific forms without departing from the spirit or scope of the invention. By way of example, although method 500 has been set forth in terms of a particular sequential order for the purposes of this explanation, it should be apparent that in many cases the ordering is not critical. For example, subscribing to version change notification shown as operation 522 can be done prior to accessing the file denoted as operation 510. Some operations may be combined or eliminated and others may be parsed into multiple operations. For example, operation 504 can be implemented as a series of multiple operations or may be eliminated since in some cases acquisition of file locator may not be required. The same functionality can also be obtained using different operations as well.

The invention has numerous advantages. One advantage is that the delay time for accessing data in a broadcasting system is significantly reduced. Another advantage is that data access can be provided without requiring a receiver to know the exact location of data. Yet another advantage is that data version updates can be provided to a receiver efficiently. Still another advantage is that cost effective and simple solutions can be implemented by using familiar file access facilities.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of providing access to a selected portion of data that is periodically transmitted via a plurality of channels by a broadcaster in a broadcast system, said method comprising:

receiving, by a receiver in said broadcast system, a request from a requester, wherein said request requests a first selected data portion in a plurality of data portions that are periodically transmitted by said broadcaster in said broadcast system via a first channel;

instantiating a first carrousel object for said first selected data portion, wherein said first carrousel object is associated with a carrousel class that can encapsulate data periodically transmitted by the broadcaster to abstract said first channel used to broadcast said first selected data portion, thereby allowing data to be accessed via said first carrousel object without requiring said requestor to access said first selected data portion via said first channel used by the broadcaster to broadcast said first selected data portion;

initiating a request to receive said first selected data portion via said first carrousel object in response to said instantiating of said first carrousel object;

determining whether said first selected data portion is available in a storage used to store said periodically transmitted data in response to said instantiating of said first carrousel object;

acquiring said first selected data portion form said storage in response to said initiating of said request when said determining determines that said first selected data portion is available in said storage;

providing access to said first selected data portion stored in said storage via said first carrousel object when said determining determines that said first selected data portion is available in said storage, thereby allowing said first selected data portion to be accessed by said requester without said requestor having to wait for the next transmission of said first selected data portion on said first channel;

storing said first selected data portion in said storage, in response to said instantiating of said first carrousel object, when said determining determines that said first selected data portion is not available in said storage;

sending, to said requestor, a notification which indicates said first selected data portion can be accessed via said first carrousel object, when said first selected data portion is stored in said storage device and becomes available for access via said first carrousel object; and providing access to said first selected data portion stored in said storage via said first carrousel object after said notification is sent, thereby allowing said requester to access said first selected data portion via said first carrousel object when it becomes available and without having to listen to said first channel.

2. A method as recited in claim 1, wherein said method further comprises:

receiving a request for updates of said first data portion;

determining whether said first data portion has been updated; and sending an update notification when said first data portion has been updated.

3. A method as recited in claim 2, wherein said method further comprises:

receiving a subscription request for updates to said first data portion; and determining whether said data portion has been updated; and sending an update notification when said determining determines that said first data portion has been updated.

4. A method as recited in claim 3, wherein said method further comprises:

receiving a request to cancel said subscription request.

5. A method as recited in claim 1, wherein said access to said first data portion is provided by creating a file system that represents data transmitted by said broadcaster, and wherein a set of input and output operations are provided for said file system.

6. A method as recited in claim 1, wherein said access to said first data portion is provided by creating an object file that represents the data transmitted by said broadcaster.

7. A method as recited in claim 6, wherein said data object is implemented as a carrousel file.

8. A method as recited in claim 7, wherein said carrousel file is implemented as a Java™ carrousel class that is compliant with Java™ Programming language.

9. A method as recited in claim 8, wherein said method further comprises:

instantiating a carrousel file object;

initiating a read operation on the carrousel file object; and waiting until the read operation successfully completes.

10. A method as recited in claim 1, wherein said access is provided by a Java TV™ compliant Application Programming Language (API).

11. A receiver suitable for accessing selected portions of data that is periodically transmitted by a broadcaster in a broadcasting system, wherein said receiver operates to:

receive, by a receiver in said broadcast system, a request from a requester, wherein said request requests a first selected data portion in a plurality of data portions that are periodically transmitted by said broadcaster in said broadcast system via a first channel;

instantiate a first carrousel object for said first selected data portion, wherein said first carrousel object is associated with a carrousel class that can encapsulate data periodically transmitted by the broadcaster to abstract said first channel used to broadcast said first selected data portion, thereby allowing data to be accessed via said first carrousel object without requiring said requestor to access said first selected data portion via said first channel used by the broadcaster to broadcast said first selected data portion;

initiate a request to receive said first selected data portion via said first carrousel object in response to said instantiating of said first carrousel object;

determine whether said first selected data portion is available in a storage used to store said periodically transmitted data in response to said instantiating of said first carrousel object;

acquire said first selected data portion form said storage in response to said initiating of said request when said determining determines that said first selected data portion is available in said storage;

provide access to said first selected data portion stored in said storage via said first carrousel object when said determining determines that said first selected data portion is available in said storage, thereby allowing said first selected data portion to be accessed by said requester without said requestor having to wait for the next transmission of said first selected data portion on said first channel;

store said first selected data portion in said storage, in response to said instantiating of said first carrousel object, when said determining determines that said first selected data portion is not available in said storage;

send, to said requestor, a notification which indicates said first selected data portion can be accessed via said first carrousel object, when said first selected data portion is stored in said storage device and becomes available for access via said first carrousel object; and provide access to said first selected data portion stored in said storage via said first carrousel object after said notification is sent, thereby allowing said requester to access said first selected data portion via said first carrousel object when it becomes available and without having to listen to said first channel.

12. A receiver as recited in claim 11, wherein said receiver further:
   receives a request for updates of said first data portion;
   determines whether said first data portion has been updated; and
   sends an update notification when said first data portion has been updated.

13. A receiver as recited in claim 11, wherein said receiver further:
   receives a subscription request for receiving updates to said first data portion; and
   determines whether said first data portion has been updated; and
   sends an update notification when said determining determines that said data portion has been updated.

14. A receiver as recited in claim 13,
   wherein said access to said first data portion is provided by creating a file system that represents the data transmitted by said broadcaster, and
   wherein a set of input and output operations are provided for said file system.

15. A receiver as recited in claim 13, wherein said access to said first data portion is provided by creating an object that represents the data transmitted by said broadcaster.

16. A receiver as recited in claim 15, wherein said data object is implemented as a carrousel file.

17. A receiver as recited in claim 13, wherein said carrousel file is implemented as a Java™ carrousel class that is compliant with Java™ Programming language.

18. A computer readable medium including computer program code for providing access to data that is periodically transmitted by a broadcaster in a broadcast system, said computer readable media comprising:
   computer program code for receiving, by a receiver in said broadcast system, a request from a requester, wherein said request requests a first selected data portion in a plurality of data portions that are periodically transmitted by said broadcaster in said broadcast system via a first channel;
   computer program code for instantiating a first carrousel object for said first selected data portion, wherein said first carrousel object is associated with a carrousel class that can encapsulate data periodically transmitted by the broadcaster to abstract said first channel used to broadcast said first selected data portion, thereby allowing data to be accessed via said first carrousel object without requiring said requestor to access said first selected data portion via said first channel used by the broadcaster to broadcast said first selected data portion;
   computer program code for initiating a request to receive said first selected data portion via said first carrousel object in response to said instantiating of said first carrousel object;
   computer program code for determining whether said first selected data portion is available in a storage used to store said periodically transmitted data in response to said instantiating of said first carrousel object;
   computer program code for acquiring said first selected data portion form said storage in response to said initiating of said request when said determining determines that said first selected data portion is available in said storage;
   computer program code for providing access to said first selected data portion stored in said storage via said first carrousel object when said determining determines that said first selected data portion is available in said storage, thereby allowing said first selected data portion to be accessed by said requester without said requestor having to wait for the next transmission of said first selected data portion on said first channel;
   computer program code for storing said first selected data portion in said storage, in response to said instantiating of said first carrousel object, when said determining determines that said first selected data portion is not available in said storage;
   computer to program code for sending, to said requestor, a notification which indicates said first selected data portion can be accessed via said first carrousel object, when said first selected data portion is stored in said storage device and becomes available for access via said first carrousel object; and
   computer program code for providing access to said first selected data portion stored in said storage via said first carrousel object after said notification is sent, thereby allowing said requester to access said first selected data portion via said first carrousel object when it becomes available and without having to listen to said first channel.

19. A computer readable medium as recited in claim 18, wherein said access to said first data portion is provided by creating an object that represents data transmitted by said broadcaster.

20. A computer readable medium as recited in claim 19, wherein said data object is implemented as a carrousel file.

21. A computer readable medium as recited in claim 19, wherein said carrousel file is implemented as a Java™ carrousel class that is compliant with Java™ Programming language.

* * * * *

UNITED STATES PATENT AND TRADEMARK OFFICE
CERTIFICATE OF CORRECTION

PATENT NO.       : 6,976,268 B2
APPLICATION NO. : 09/733609
DATED            : December 13, 2005
INVENTOR(S)      : Courtney et al.

It is certified that error appears in the above-identified patent and that said Letters Patent is hereby corrected as shown below:

(column 12, line 28) delete first instance of "to".

(column 12, line 48)) change "carousel" to --carrousel--.

Signed and Sealed this

Twenty-ninth Day of August, 2006

JON W. DUDAS
*Director of the United States Patent and Trademark Office*